United States Patent
Sprafke et al.

(10) Patent No.: US 11,559,973 B2
(45) Date of Patent: Jan. 24, 2023

(54) POLYMER FILM CONTAINING AN AMORPHOUS AND A PARTIALLY CRYSTALLINE POLYAMIDE

(71) Applicant: BASF SE, Ludwigshafen am Rhein (DE)

(72) Inventors: Johannes Klaus Sprafke, Ludwigshafen (DE); Rolf Minkwitz, Ludwigshafen (DE); Walter Goetz, Gruenenbach (DE)

(73) Assignee: BASF SE

( * ) Notice: Subject to any disclaimer, the term of this patent is extended or adjusted under 35 U.S.C. 154(b) by 292 days.

(21) Appl. No.: 16/075,388

(22) PCT Filed: Jan. 31, 2017

(86) PCT No.: PCT/EP2017/052058
§ 371 (c)(1),
(2) Date: Aug. 3, 2018

(87) PCT Pub. No.: WO2017/134054
PCT Pub. Date: Aug. 10, 2017

(65) Prior Publication Data
US 2019/0040216 A1     Feb. 7, 2019

(30) Foreign Application Priority Data
Feb. 5, 2016  (EP) .................................. 16154413

(51) Int. Cl.
| B32B 27/34 | (2006.01) |
| C08L 77/06 | (2006.01) |
| B32B 27/30 | (2006.01) |
| C08L 77/02 | (2006.01) |
| B32B 27/32 | (2006.01) |
| B32B 27/36 | (2006.01) |
| B32B 27/08 | (2006.01) |
| C08G 69/26 | (2006.01) |

(52) U.S. Cl.
CPC ............ *B32B 27/304* (2013.01); *B32B 27/08* (2013.01); *B32B 27/306* (2013.01); *B32B 27/32* (2013.01); *B32B 27/34* (2013.01); *B32B 27/36* (2013.01); *C08G 69/265* (2013.01); *C08L 77/02* (2013.01); *C08L 77/06* (2013.01); B32B 2270/00 (2013.01); B32B 2307/702 (2013.01); B32B 2307/704 (2013.01); B32B 2307/736 (2013.01); B32B 2439/70 (2013.01); C08J 2300/12 (2013.01); C08J 2377/02 (2013.01); C08J 2400/12 (2013.01); C08J 2477/06 (2013.01)

(58) Field of Classification Search
CPC ....... B32B 27/304; B32B 27/32; B32B 27/36; B32B 27/08; B32B 27/306; B32B 27/34; B32B 2270/00; B32B 2307/702; B32B 2307/704; B32B 2307/736; B32B 2439/70; C08G 69/265; C08L 77/02; C08L 77/06; C08J 2300/12; C08J 2377/02; C08J 2400/12; C08J 2477/06; C08J 5/18; C08J 2377/06

See application file for complete search history.

(56) References Cited

U.S. PATENT DOCUMENTS

| 3,563,959 A * | 2/1971 | Schade et al. ......... C08G 69/26 528/347 |
| 4,800,129 A | 1/1989 | Deak |
| 5,266,655 A | 11/1993 | Prevost et al. |
| 5,562,996 A | 10/1996 | Kuriu et al. |
| 5,688,456 A | 11/1997 | Kuriu et al. |
| 6,916,517 B2 | 7/2005 | Montanari et al. |
| 2006/0228502 A1 | 10/2006 | Bekele |
| 2011/0076507 A1 | 3/2011 | Shearer et al. |
| 2011/0306701 A1* | 12/2011 | Weber ..................... C08L 25/08 523/351 |
| 2012/0040117 A1 | 2/2012 | Uehara et al. |
| 2012/0094102 A1 | 4/2012 | Stroeks et al. |
| 2012/0321829 A1 | 12/2012 | Bayer et al. |
| 2014/0135444 A1 | 5/2014 | Stroeks et al. |
| 2017/0081473 A1* | 3/2017 | Benstead ............. C08G 69/265 |

FOREIGN PATENT DOCUMENTS

| EP | 0287839 A2 | 10/1988 |
| EP | 0358038 A1 | 3/1990 |
| EP | 0465931 A2 | 1/1992 |
| EP | 2535365 A1 | 12/2012 |
| EP | 2848390 A1 | 3/2015 |
| RU | 2 510 947 C2 | 4/2014 |
| WO | WO 99/12735 A1 | 3/1999 |
| WO | WO 2010/081871 A1 | 7/2010 |

OTHER PUBLICATIONS

Anonymous, "Amorphous Polyamide Films With Controlled Crystallinity," Research Disclosure Database No. 608030, Published: Nov. 2014. (Year: 2014).*
International Search Report dated Apr. 21, 2017, in PCT/EP2017/052058, filed Jan. 31, 2017.
Extended European Search Report dated Jul. 21, 2016 in European Patent Application No. 16154413.5 (with English translation of Category of Cited Documents), 6 pages.

* cited by examiner

*Primary Examiner* — John D Freeman
(74) *Attorney, Agent, or Firm* — Faegre Drinker Biddle & Reath LLP

(57) ABSTRACT

The present invention relates to a polymer film (P) containing a polyamide composition (PC) that comprises an amorphous polyamide (A) and a semicrystalline polyamide (B) and to a method for producing the polymer film (P). The present invention further relates to a method for packaging food products with the polymer film (P).

14 Claims, No Drawings

POLYMER FILM CONTAINING AN AMORPHOUS AND A PARTIALLY CRYSTALLINE POLYAMIDE

The present invention relates to a polymer film (P), comprising a polyamide composition (PC) that comprises an amorphous polyamide (A) and a semicrystalline polyamide (B), and a method for producing the polymer film (P). The present invention further relates to a method for packaging food products with the polymer film (P).

Polyamides are of particular industrial importance as they are characterized by highly favorable mechanical properties, possessing in particular high strength, stiffness, and toughness, good chemical resistance, and high abrasion resistance. They are used for example for producing fishing lines, climbing ropes, and carpeting. In addition, polyamides are used for producing packaging films and packaging wrappers.

Concerning use of semicrystalline polyamides as packaging films or packaging wrappers, as the oxygen permeability of semicrystalline polyamides is often too high, they are unsuitable in particular for the packaging of food products. Various methods are described in the prior art for modifying crystalline polyamides in order to alter their properties so that they can be used as packaging films or packaging wrappers. In particular, the properties of semicrystalline polyamides are frequently modified by producing blends of semicrystalline polyamides with amorphous polyamides. U.S. Pat. No. 5,266,655 describes blends of amorphous polyamides with semicrystalline polyamides. Amorphous polyamides can be produced for example from 2-methyl-1,5-pentamethylene diamine and isophthalic acid. Examples of disclosed semicrystalline polyamides are Nylon 66 and Nylon 6. The blend thereof comprises less than 40 wt % of semicrystalline polyamide so that it is amorphous as a whole.

U.S. Pat. No. 4,800,129 describes blends of an amorphous polyamide and a semicrystalline polyamide, wherein a hexamethylene diamine isophthalamide or a hexamethylene diamine isophthalamide/hexamethylene diamine terephthalamide copolymer is used as an amorphous polyamide. 10 to 40 wt % of the semicrystalline polyamide and 90 to 60 wt % of the amorphous polyamide are used. Films can be produced from these blends.

EP 0358038 also describes polyamide blends comprising an amorphous polyamide and a semicrystalline polyamide. A hexamethylene diamine isophthalamide/hexamethylene diamine terephthalamide copolymer (polyamide 6I/6T) is used as an amorphous polyamide, and polyamides such as Nylon 6/12 and Nylon 6/66 have been disclosed as semicrystalline polyamides. The blend comprises 10 to 70 wt % of the amorphous polyamide and 10 to 90 wt % of the semicrystalline polyamide. These blends can be used for producing films.

The drawbacks of the blends described in U.S. Pat. Nos. 5,266,655 and 4,800,129 are that they can only be extruded with difficulty and tend to form wrinkled films. They show only quite low puncture resistance. The drawback of the blends described in EP 0358038 is their relatively high oxygen permeability, in particular at high humidity and higher temperatures. They also possess only low tensile and bending strength.

The object of the present invention was to provide a polymer that comprises a polyamide and either does not have the drawbacks of the polymer films described in the prior art or has these drawbacks only to a reduced extent. The polymer film should also be producible as simply and economically as possible.

This object was achieved by means of a polymer film (P) containing at least one polyamide composition (PC), comprising the components
(A) 2 to 30 wt % of at least one amorphous polyamide produced by polymerization of the components
(A1) at least one dicarboxylic acid,
(A2) at least one diamine; and
(B) 70 to 98 wt % of at least one semicrystalline polyamide,
wherein component (A1) comprises isophthalic acid and component (A2) comprises 2-methyl-1,5-diaminopentane, and wherein the respective percentages by weight are based on the total percentages by weight of components (A) and (B).

Surprisingly, it was found that the polymer films (P) according to the invention have a low oxygen permeability even at high humidity and high temperatures, for example above 25° C. They therefore provide a better oxygen barrier than the polymer films described in the prior art. Moreover, they show high tensile and bending strength and have favorable production properties, particularly as they show little wrinkling in production, in particular in production by film extrusion.

The polymer films (P) according to the invention also show particularly low migration with respect to monomers, in particular low migration with respect to the monomers from which the at least one amorphous polyamide (A) is produced. For example, less than 5 mg of isophthalic acid and less than 2.5 mg of 2-methyl-1,5-diaminopentane migrate in 3% aqueous acetic acid solution, 10% aqueous ethanol solution and 50% aqueous ethanol solution measured for 10 days at 60° C. according to EN 13130-1 and EN 13130-2. If terephthalic acid is additionally used as the at least one dicarboxylic acid (A1), less than 7.5 mg of terephthalic acid migrates under these conditions. Measurement is carried out by immersing one square decimeter of the polymer film (P) with a thickness of 50 μm on both sides in 100 ml of solvent (3% aqueous acetic acid solution, 10% aqueous ethanol solution or 50% aqueous ethanol solution) and multiplying the measured concentration by 6 according to EN 13130-1:2004 Chapter 10.2 in order to simulate contact with 1 kg of food products.

The invention is explained in further detail below.

Polymer Film (P)

According to the invention, the polymer film (P) comprises at least one polyamide composition (PC).

In the context of the present invention, "at least one polyamide composition (PC)" is understood to refer both to one polyamide composition (PC) and to a mixture of two or more polyamide compositions (PC).

The polymer film (P) has for example a thickness in the range of 0.1 μm to 1 mm, preferably in the range of 5 to 500 μm and particularly preferably in the range of 20 to 100 μm.

Subject matter of the present invention is therefore also a polymer film (P) in which the polymer film (P) has a thickness in the range of 0.1 μm to 1 mm.

In addition to the at least one polyamide composition (PC), the polymer film (P) can comprise at least one further polymer (P2).

In the context of the present invention, "at least one further polymer (P2)" means both exactly one further polymer (P2) and a mixture of two or more further polymers (P2).

Suitable as the at least one further polymer (P2) are all polymers known to the person skilled in the art. If a mixture of two or more further polymers (P2) is used as the at least one further polymer (P2), this mixture is then different from the at least one polyamide composition (PC).

Preferably, the at least one further polymer (P2) is selected from the group composed of polyolefins, ethyl vinyl alcohols, ethyl vinyl acetates, polyethylene terephthalates, polyvinylidene chlorides, maleic anhydride grafted polyolefins, polyesters and ionomers. Particularly preferably, the at least one further polymer (P2) is selected from the group composed of polyolefins, ethyl vinyl alcohols, ethyl vinyl acetates, polyethylene terephthalates, polyvinylidene chlorides and maleic anhydride grafted polyolefins. Most preferably, the at least one further polymer (P2) is selected from the group composed of polyolefins, maleic anhydride grafted polyolefins and ethyl vinyl alcohols.

If the at least one further polymer (P2) is selected from the group composed of polyolefins, it is preferable to additionally use maleic anhydride grafted polyolefins as the at least one further polymer (P2). In this case, it is possible to use a mixture of polyolefins and maleic anhydride grafted polyolefins as the at least one further polymer (P2). If the polymer film (P) is a multilayer film as described below, it is also possible for the polymer film (P) to comprise at least one first further layer of at least one further polymer (P2), wherein the at least one further polymer (P2) is selected from the group composed of maleic anhydride grafted polyolefins and the polymer film (P) comprises at least one second further layer of at least one further polymer (P2), and wherein the at least one further polymer (P2) is selected from the group composed of polyolefins. In this case, the polymer film (P) preferably comprises the first further layer between the first layer of the at least one polyamide composition (PC) and the second further layer.

Polyolefins are known per se to the person skilled in the art. Preferred polyolefins are polypropylene (PP), low-density polyethylene (LDPE), linear low-density polyethylene (LLDPE) and very-low-density polyethylene (VLDPE).

Linear low-density polyethylene (LLDPE) is a copolymer of ethylene and at least one $C_4$-$C_8$-α-olefin. Linear low-density polyethylene (LLDPE) is characterized by long polymer chains with a low number of side chains or crosslinks. The number of side chains in linear low-density polyethylene (LLDPE) is ordinarily lower than in low-density polyethylene (LDPE) and medium-density polyethylene (MDPE). The melting point of linear low-density polyethylene (LLDPE) is preferably in the range of 110 to 130° C., and its density is in the range of 0.91 to 0.93 g/cm$^3$.

Very-low-density polyethylenes (VLDPE) are copolymers of ethylene and at least one $C_4$-$C_8$-α-olefin. They ordinarily have a melting point in the range of 110 to 130° C. and a density in the range of 0.86 to <0.91 g/cm$^3$. As a rule, the content of $C_4$-$C_8$-α-olefins in VLDPE is greater than in LLDPE.

In the context of the present invention, "$C_4$-$C_8$-α-olefins" are understood to refer to linear and branched, preferably linear, alkylenes (alkenes) with 4 to 8 carbon atoms that are unsaturated at the α-position, i.e. have a C—C double bond at the α-position. Examples are 1-butene, 1-pentene, 1-hexene, 1-heptene and 1-octene. 1-Butene, 1-hexene and 1-octene are preferred.

Preferred poly(ethylene vinyl acetates) are copolymers of ethylene with vinyl acetate. For example, 82 to 99.9 wt % of ethylene and 0.1 to 18 wt % of vinyl acetate and preferably 88 to 99.9 wt % of ethylene and 0.1 to 12 wt % of vinyl acetate are used for production.

Preferred poly(ethylene vinyl alcohols) are obtainable by complete or partial saponification of the above-described poly(ethylene vinyl acetates). For example, the poly(ethylene vinyl alcohols) comprise 50 to 75 mol % of ethylene and 25 to 50 mol % of vinyl alcohol based on the total amount of substance of the poly(ethylene vinyl alcohols).

The polymer film (P) can comprise the at least one further polymer (P2) as a blend (mixture) with the at least one polyamide composition (PC). In addition, it is possible and preferred according to the invention for the polymer film (P) to comprise the at least one polyamide composition (PC) as the at least one first layer and to comprise the at least one further polymer (P2) as the at least one further layer.

In this embodiment, it is preferable for the at least one first layer comprising the at least one polyamide composition (PC) to contain no further polymer (P2).

In the context of the present invention, "at least one further layer" means both exactly one further layer and two or more further layers. Two or more further layers are preferred.

It is also preferable if the polymer film (P) comprises at least one first layer of the at least one polyamide composition (PC) and the polymer film (P) further comprises at least one further layer, wherein the at least one further layer comprises at least one further polymer (P2) selected from the group composed of polyolefins, poly(ethylene vinyl alcohols), poly(ethylene vinyl acetates), polyethylene terephthalates, polyvinylidene chlorides and maleic anhydride grafted polyolefins.

Subject matter of the present invention is therefore also a polymer film (P), in which the polymer film (P) comprises at least one layer of the at least one polyamide composition (PC) and the polymer film (P) comprises at least one further layer, wherein the at least one further layer comprises at least one further polymer (P2) that is selected from the group composed of polyolefins, poly(ethylene vinyl alcohols), poly(ethylene vinyl acetates), polyethylene terephthalates, polyvinylidene chlorides and maleic anhydride grafted polyolefins.

If the polymer film (P) comprises exactly one first layer of the at least one polyamide composition (PC), optionally as a blend with at least one further polymer (P2), and no further layer, the polymer film (P) is also referred to as a monolayer film.

If the polymer film (P) comprises at least one first layer of the at least one polyamide composition (PC) and at least one further layer of at least one further polymer (P2), the polymer film (P) is also referred to as a multilayer film.

In this case, for example, the polymer film (P) comprises 1 to 5 first layers of the at least one polyamide composition (PC) and 1 to 10 further layers of the at least one further polymer (P2), the polymer film (P) preferably comprises 1 to 3 first layers of the at least one polyamide composition (PC) and 1 to 8 further layers of the at least one further polymer (P2), and the polymer film (P) particularly preferably comprises 1 to 2 first layers of the at least one polyamide composition (PC) and 1 to 6 further layers of the at least one further polymer (P2).

In the context of the present invention, the term "polymer film (P)" also comprises both monolayer films and multilayer films.

Subject matter of the present invention is therefore also a polymer film (P), wherein the polymer film (P) is a monolayer film or a multilayer film.

As described above, the polymer film (P) ordinarily has a thickness in the range of 0.1 μm to 1 mm, preferably in the range of 5 to 500 μm and particularly preferably in the range of 10 to 100 μm.

If the polymer film (P) is a monolayer film, the exactly one layer of the at least one polyamide composition (PC) of the polymer film (P) ordinarily has the same thickness as the polymer film (P). In this case, the thickness of the first layer of the at least one polyamide composition (PC) is thus for example in the range of 0.1 μm to 1 mm, preferably in the range of 5 to 500 μm and particularly preferably in the range of 10 to 100 μm.

If the polymer film (P) is a multilayer film, the thicknesses of the individual layers of the polymer film (P), i.e. the thickness of the at least one first layer of the at least one polyamide composition (PC) and the thickness of the at least one further layer of the at least one further polymer (P2), are ordinarily less than the thickness of the polymer film (P). In this case, the sum of the thicknesses of the individual layers generally corresponds to the thickness of the polymer film (P).

The at least one first layer of the at least one polyamide composition (PC) then has a thickness in the range of 0.1 to 100 μm, preferably in the range of 0.5 to 50 μm and particularly preferably in the range of 0.5 to 10 μm.

In this case, the at least one further layer of the at least one further polymer (P2) comprises for example a thickness in the range of 0.1 to 100 μm, preferably in the range of 0.5 to 50 μm and particularly preferably in the range of 0.5 to 10 μm.

The polymer film (P) can comprise at least one bonding agent. This embodiment is preferred if the polymer film (P) is a multilayer film.

In the context of the present invention, "at least one bonding agent" means both exactly one bonding agent and a mixture of two or more bonding agents.

If the polymer film (P) is a multilayer film, the at least one bonding agent can be contained together with the at least one polyamide composition (PC) in the at least one first layer. In this case, the at least one polyamide composition (PC) comprises the at least one bonding agent. It is also possible for the at least one bonding agent to be contained together with the at least one further polymer (P2) in the at least one further layer. In this case, the at least one further polymer (P2) comprises the at least one bonding agent. In addition, it is possible for the at least one bonding agent to be contained in the polymer film (P) as the at least one additional layer.

This embodiment is preferred.

If the at least one bonding agent is contained in the polymer film (P) as the at least one additional layer, this at least one additional layer is preferably arranged between the at least one further layer of the further polymer (P2) and the at least one first layer of the at least one polyamide composition (PC).

Suitable bonding agents are known per se to the person skilled in the art. Preferred as bonding agents are copolymers of ethylene with maleic anhydride or a copolymer of ethylene with vinyl acetate. Preferred is a copolymer of linear low-density polyethylene (LLDPE) and maleic anhydride or a copolymer of ethylene and vinyl acetate, wherein for producing the copolymer, >18 wt % of vinyl acetate and <82 wt % of ethylene are used. These copolymers are commercially available, for example under the brand names Bynel 4105 from the firm DuPont or Escorene FL00119 from the firm Exxon.

Polyamide Composition (PC)

According to the invention, the polymer film (P) comprises at least one polyamide composition (PC), comprising the components (A) 2 to 30 wt % of at least one amorphous polyamide, produced by polymerization of component (A1), at least one dicarboxylic acid, and (A2) at least one diamine, and
(B) 70 to 98 wt % of at least one semicrystalline polyamide, wherein component (A1) comprises isophthalic acid and component (A2) comprises 2-methyl-1,5-diaminopentane and wherein the respective percentages by weight are based on the total wt % of components (A) and (B).

The polymer film (P) thus ordinarily comprises at least one polyamide composition (PC), which as component (A) comprises 2 to 30 wt % of at least one amorphous polyamide that contains units derived from at least one dicarboxylic acid (A1) comprising isophthalic acid and units derived from at least one diamine (A2) comprising 2-methyl-1,5-diaminopentane, and which as component (B) comprises 70 to 98 wt % of at least one semicrystalline polyamide, wherein the respective percentages by weight are based on the total wt % of components (A) and (B). Subject matter of the present invention is therefore also a polymer film (P) containing at least one polyamide composition (PC), comprising the components (A) 2 to 30 wt % of at least one amorphous polyamide that contains units derived from at least one dicarboxylic acid (A1) comprising isophthalic acid and units derived from at least one diamine (A2) comprising 2-methyl-1,5-diaminopentane, and
(B) 70 to 98 wt % of at least one semicrystalline polyamide, wherein the respective percentages by weight are based on the total percentages by weight of components (A) and (B).

In the context of the present invention, the terms "at least one amorphous polyamide (A)" and "component (A)" are used synonymously and therefore have the same meaning.

In the context of the present invention, the terms "at least one semicrystalline polyamide (B)" and "component (B)" are used synonymously and therefore have the same meaning.

In the context of the present invention, "at least one amorphous polyamide (A)" means both exactly one amorphous polyamide (A) and a mixture of two or more amorphous polyamides (A).

The same applies to "at least one semicrystalline polyamide (B)." In the context of the present invention, "at least one semicrystalline polyamide (B)" means both exactly one semicrystalline polyamide (B) and a mixture of two or more semicrystalline polyamides (B).

According to the invention, the polyamide composition (PC) comprises 2 to 30 wt % of the at least one amorphous polyamide (A), preferably 2 to 20 wt % of the at least one amorphous polyamide (A) and particularly preferably 2 to 15 wt % of the at least one amorphous polyamide (A), based in each case on the sum of the percentages by weight of components (A) and (B), preferably based on the total weight of the polyamide composition (PC).

According to the invention, the at least one polyamide composition (PC) comprises 70 to 98 wt % of the at least one semicrystalline polyamide (B), preferably 80 to 98 wt % and particularly preferably 85 to 98 wt % of the at least one semicrystalline polyamide (B), based in each case on the sum of the percentages by weight of components (A) and (B), preferably based on the total weight of the at least one polyamide composition (PC).

Preferably, the sum of the percentages by weight of components (A) and (B) is 100%.

The at least one polyamide composition (PC) ordinarily has a glass transition temperature ($T_{G(PC)}$). For example, the glass transition temperature ($T_{G(PC)}$) is in the range of 20 to 90° C., preferably in the range of 30 to 80° C. and particularly preferably in the range of 40 to 70° C., determined according to ISO 11357-2:2014. In the context of the present invention, the glass transition temperature ($T_{G(PC)}$) of the at least one polyamide composition (PC) refers according to ISO 11357-2:2014 to the glass transition temperature ($T_{G(PC)}$) of the dry polyamide composition (PC). In the context of the present invention, "dry" means that the at least one polyamide composition (PC) comprises less than 1 wt %, preferably less than 0.5 wt % and particularly preferably less than 0.1 wt % of water, based on the total weight of the at least one polyamide composition (PC). More preferably, "dry" means that the at least one polyamide composition (PC) contains no water, and most preferably that the at least one polyamide composition (PC) contains no solvent.

Moreover, the at least one polyamide composition (PC) ordinarily has a melting point ($T_{M(PC)}$). The melting point ($T_{M(PC)}$) of the at least one polyamide composition (PC) is for example in the range of 130 to 230° C., preferably in the range of 150 to 220° C. and particularly preferably in the range of 180 to 215° C., determined according to ISO 11357-3: 2014.

The at least one polyamide composition (PC) generally has an intrinsic viscosity ($IV_{(PC)}$) in the range of 70 to 350 ml/g, determined in a 0.5 wt % of solution of the at least one polyamide composition (PC) in 96 wt % of sulfuric acid at 25° C. The intrinsic viscosity ($IV_{(PC)}$) of the at least one polyamide composition (PC) is preferably in the range of 100 to 300 ml/g and particularly preferably in the range of 150 to 260 ml/g, determined in a 0.5 wt % of solution of the at least one polyamide composition (PC) in 96 wt % of sulfuric acid at 25° C. measured according to ISO 307:2013-08.

The at least one polyamide composition (PC) can further comprise at least one further polymer (P2). For the at least one further polymer (P2), the above-described embodiments and preferences apply correspondingly to at least one further polymer (P2).

Preferably, the at least one polyamide composition (PC) comprises no further polymer (P2).

The at least one polyamide composition (PC) can also comprise additives. Such additives are known to the person skilled in the art and for example are selected from the group composed of stabilizers, dyes, antistatics, tackifiers, antiblocking agents, processing auxiliaries, antioxidants, light stabilizers, UV absorbers, lubricants and nucleating agents.

Suitable stabilizers, dyes, antistatics, tackifiers, antiblocking agents, processing auxiliaries, antioxidants, light stabilizers, UV absorbers, lubricants and nucleating agents are known per se to the person skilled in the art.

Suitable as dyes are organic and inorganic pigments such as titanium dioxide provided with a sizing agent. Examples of suitable tackifiers are polyisobutylene (PIB) or ethyl vinyl acetate (EVA). Suitable antiblocking agents are for example silicon dioxide or calcium carbonate particles. Suitable light stabilizers are for example so-called HALS (hindered amine light stabilizers). An example of a suitable processing auxiliary or lubricant is ethylene bis stearamide (EBS) wax. Nucleating agents can for example be all kinds of organic or inorganic nucleating agents, such as talc.

Component (A)

Component (A) is at least one amorphous polyamide.

In the context of the present invention, "amorphous" means that the polyamide shows no melting point in measurement by differential scanning calorimetry (DSC) according to ISO 11357.

"No melting point" means that the melting enthalpy $\Delta H2_{(A)}$ is less than 10 J/g, preferably less than 8 J/g and particularly preferably less than 5 J/g, measured in each case by means of dynamic differential scanning calorimetry (DSC) according to ISO 11357-4:2014.

The at least one amorphous polyamide (A) according to the invention also ordinarily has a melting enthalpy $\Delta H2_{(A)}$ less than 10 J/g, preferably less than 8 J/g and particularly preferably less than 5 J/g, measured in each case by means of dynamic differential scanning calorimetry (DSC) according to ISO 11357-4:2014.

Suitable amorphous polyamides (A) generally have an intrinsic viscosity ($IV_{(A)}$) in the range of 60 to 200 ml/g, preferably in the range of 70 to 150 ml/g and particularly preferably in the range of 75 to 125 ml/g, determined in a 0.5 wt % of solution of component (A) in 96 wt % of sulfuric acid at 25° C. according to ISO 307:2013-08.

Subject matter of the present invention is therefore also a polymer film (P) in which component (A) has an intrinsic viscosity ($IV_{(A)}$) in the range of 60 to 200 ml/g determined in a 0.5 wt % of solution of component (A) in 96 wt % of sulfuric acid at 25° C.

Component (A) according to the invention ordinarily has a glass transition temperature ($T_{G(A)}$), wherein the glass transition temperature is ordinarily in the range of 130 to 150° C., preferably in the range of 133 to 147° C. and particularly preferably in the range of 135 to 145° C., determined according to ISO 11357-2:2014.

Subject matter of the present invention is therefore also a polymer film (P) in which the polymer film (P) component (A) has a glass transition temperature ($T_{G(A)}$), wherein the glass transition temperature ($T_{G(A)}$) is in the range of 130 to 150° C.

Suitable components (A) have a weight average molecular weight ($M_{w(A)}$) in the range of 5,000 to 35,000 g/mol, preferably in the range of 10,000 to 30,000 g/mol and particularly preferably in the range of 15,000 to 25,000 g/mol. The weight average molecular weight is determined by SEC-MALLS (size exclusion chromatography-multi-angle laser light scattering) according to Chi-san Wu, "Handbook of size exclusion chromatography and related techniques," pg. 19.

The at least one amorphous polyamide (A) is produced according to the invention by polymerization of at least one dicarboxylic acid (A1) and at least one diamine (A2), wherein the at least one dicarboxylic acid (A1) comprises isophthalic acid and the at least one diamine (A2) comprises 2-methyl-1,5-diaminopentane.

For example, 45 to 70 wt % of the at least one dicarboxylic acid (A1) and 30 to 55 wt % of the at least one diamine (A2) are polymerized to produce the amorphous polyamide (A), based in each case on the sum of the percentages by weight of components (A1) and (A2).

Preferably, 50 to 65 wt % of the at least one dicarboxylic acid (A1) and 35 to 50 wt % of the at least one diamine (A2) are polymerized to produce the amorphous polyamide (A), based in each case on the sum of the percentages by weight of components (A1) and (A2).

Particularly preferably, 55 to 60 wt % of the at least one dicarboxylic acid (A1) and 40 to 45 wt % of the at least one diamine (A2) are polymerized to produce the amorphous polyamide (A), based in each case on the sum of the percentages by weight of components (A1) and (A2).

The percentages by weight of components (A1) and (A2) are based on components (A1) and (A2) before polymerization, i.e. on the percentages by weight of components (A1) and (A2) before components (A1) and (A2) have reacted with each other.

The percentages by weight of components (A1) and (A2) preferably add up to 100%.

In the context of the present invention, "at least one dicarboxylic acid (A1)" is understood to refer both to one dicarboxylic acid (A1) and to a mixture of two or more dicarboxylic acids (A1). Preferred according to the invention is a mixture of two or more dicarboxylic acids.

In the context of the present invention, the terms "at least one dicarboxylic acid (A1)" and "component (A1)" are used synonymously and therefore have the same meaning.

According to the invention, component (A1) comprises isophthalic acid. Component (A1) can be composed of isophthalic acid. According to the invention, component (A1) preferably comprises 20 to 95 mol % of isophthalic acid, and component (A1) particularly preferably comprises 25 to 90 mol % of isophthalic acid and particularly preferably 30 to 85 mol % of isophthalic acid, based respectively on the total amount of substance of component (A1).

Component (A1) can also comprise further dicarboxylic acids, with aromatic dicarboxylic acids being preferred as further dicarboxylic acids. It is also preferable if component (A1) also contains further aromatic dicarboxylic acids. Such aromatic dicarboxylic acids are known to the person skilled in the art and for example are selected from the group composed of terephthalic acid and phthalic acid, wherein terephthalic acid is preferred.

According to the invention, component (A1) preferably comprises isophthalic acid and terephthalic acid. Particularly preferably, component (A1) is composed of isophthalic acid and terephthalic acid.

For example, component (A1) contains 20 to 95 mol % of isophthalic acid and 5 to 80 mol % of terephthalic acid, based respectively on the total amount of substance of component (A1).

Preferably, component (A1) comprises 25 to 90 mol % of isophthalic acid and 10 to 75 mol % of terephthalic acid, based respectively on the total amount of substance of component (A1).

Particularly preferably, component (A1) comprises 30 to 85 mol % of isophthalic acid and 15 to 70 mol % of terephthalic acid, based respectively on the total amount of substance of component (A1).

Subject matter of the present invention is therefore also a polymer film (P) in which component (A1) comprises 20 to 95 mol % of isophthalic acid and 5 to 80 mol % of terephthalic acid, based respectively on the total amount of substance of component (A1).

In the context of the present invention, "at least one diamine (A2)" is understood to mean both exactly one diamine (A2) and a mixture of two or more diamines (A2). Preferred according to the invention is exactly one diamine (A2).

In the context of the present invention, the terms "at least one diamine (A2)" and "component (A2)" are used synonymously and therefore have the same meaning.

According to the invention, component (A2) comprises 2-methyl-1,5-diaminopentane. For example, component (A2) comprises at least 20 mol %, preferably at least 50 mol % and particularly preferably at least 90 mol % of 2-methyl-1,5-diaminopentane, based respectively on the total amount of substance of component (A2). Most preferably, component (A2) is composed of 2-methyl-1,5-diaminopentane.

In addition, component (A2) can comprise further diamines. Suitable further diamines are known per se to the person skilled in the art, with hexamethylene diamine being an example.

For example, component (A2) comprises 2-methyl-1,5-diaminopentane in the range of 20 to 99.9 mol % and hexamethylene diamine in the range of 0.1 to 80 mol %, based respectively on the total amount of substance of component (A2).

Particularly preferably, component (A2) is composed of 2-methyl-1,5-diaminopentane. In this case, component (A2) comprises no further diamine.

It is therefore preferable for component (A) to comprise an amorphous polyamide (A) produced from isophthalic acid (component (A1)) and 2-methyl-1,5-diaminopentane (component (A2)), and particularly preferably, component (A) is composed of this amorphous polyamide (A). Component (A) then comprises a poly(2-methyl-1,5-pentamethylene isophthalamide), and component (A) is particularly preferably composed of a poly(2-methyl-1,5-pentamethylene isophthalamide).

It is also preferable for component (A) to comprise an amorphous polyamide (A) produced from isophthalic acid and terephthalic acid (component (A1)) and 2-methyl-1,5-diaminopentane (component (A2)), and particularly preferably, component (A) is composed of this amorphous polyamide (A). Component (A) then comprises a poly(2-methyl-1,5-pentamethylene amine isophthalamide-co-2-methyl-1,5-pentamethylene terephthalamide), and component (A) is particularly preferably composed of a poly(2-methyl-1,5-pentamethylene amine isophthalamide-co-2-methyl-1,5-pentamethylene terephthalamide).

Subject matter of the present invention is therefore also a polymer film (P) in which component (A) comprises a poly(2-methyl-1,5-pentamethylene isophthalamide-co-2-methyl-1,5-pentamethylene terephthalamide).

Component (A) is produced by polymerization of components (A1) and (A2). Polymerization of components (A1) and (A2) is known to the person skilled in the art. Ordinarily, the polymerization of components (A1) and (A2) is a condensation reaction.

The polymerization of components (A1) and (A2) can take place in the presence of a catalyst.

Suitable as catalysts are all of the catalysts known to the person skilled in the art that catalyze the polymerization of components (A1) and (A2). Such catalysts are known to the person skilled in the art. Preferred catalysts are phosphorus compounds, such as sodium hypophosphite, phosphorous acid, triphenyl phosphine or triphenyl phosphite.

In polymerization of components (A1) and (A2), the at least one amorphous polyamide (A) is obtained. The at least one amorphous polyamide therefore comprises structural units derived from component (A1) and structural units derived from component (A2).

In an embodiment of the present invention, it is preferable for the at least one amorphous polyamide (A) to be produced by polymerization of components (A1) and (A2) and additionally a component (A3). Component (A3) is at least one further monomer selected from the group composed of lactams with 4 to 12 carbon atoms and monomer mixtures (M) comprising at least one linear aliphatic dicarboxylic acid with 4 to 12 carbon atoms and at least one linear aliphatic diamine with 4 to 12 carbon atoms.

Subject matter of the present invention is therefore also a polymer film (P) in which the at least one amorphous polyamide (A) is produced by polymerization of components (A1) and (A2) and additionally a component (A3), wherein component (A3) is selected from the group composed of lactams with 4 to 12 carbon atoms and monomer mixtures (M) comprising at least one linear aliphatic dicarboxylic acid with 4 to 12 carbon atoms and at least one linear aliphatic diamine with 4 to 12 carbon atoms.

In the context of the present invention, "at least one linear aliphatic dicarboxylic acid" means that the at least one linear aliphatic dicarboxylic acid has no branching, meaning that the at least one linear aliphatic dicarboxylic acid has no alkyl substituents.

The same applies to "at least one linear aliphatic diamine." In the context of the present invention, "at least one linear aliphatic diamine" means that the at least one linear aliphatic diamine has no branching, meaning that the at least one linear aliphatic diamine has no alkyl substituents. For this reason, the at least one linear aliphatic diamine contained in the monomer mixture (M) is different from the 2-methyl-1,5-diaminopentane contained in component (A2).

For example, 38.5 to 60 wt % of component (A1), 28 to 45 wt % of component (A2) and 0.1 to 30 wt % of component (A3) are polymerized to produce the amorphous polyamide (A), based in each case on the sum of the percentages by weight of components (A1), (A2) and (A3).

Preferably, 44 to 60 wt % of component (A1), 32 to 45 wt % of component (A2) and 0.1 to 20 wt % of component (A3) are polymerized to produce the amorphous polyamide (A), based in each case on the sum of the percentages by weight of components (A1), (A2) and (A3).

Particularly preferably, 50 to 60 wt % of component (A1), 35 to 45 wt % of component (A2) and 0.1 to 10 wt % of component (A3) are polymerized to produce the amorphous polyamide (A), based in each case on the sum of the percentages by weight of components (A1), (A2) and (A3).

In the context of the present invention, "at least one further monomer" means both exactly one further monomer and a mixture of two or more further monomers.

In the context of the present invention, the terms "at least one further monomer" and "component (A3)" are used synonymously and therefore have the same meaning.

According to the invention, component (A3) is selected from the group composed of lactams with 4 to 12 carbon atoms and monomer mixtures (M).

According to the invention, lactams are understood to be cyclic amides having 4 to 12, preferably 5 to 8 carbon atoms in the ring. Suitable lactams are selected for example from the group composed of propio-3-lactam (β-lactam; β-propiolactam), butyro-4-lactam (γ-lactam; γ-butyrolactam), 2-piperidinone, (δ-lactam; δ-valerolactam), hexano-6-lactam (ε-lactam; ε-caprolactam), heptano-7-lactam (ζ-lactam; ζ-heptanolactam), octano-8-lactam (η-lactam; η-octanolactam), nonano-9-lactam (θ-lactam; θ-nonanolactam), decano-10-lactam (ω-decanolactam), undecano-11-lactam (ω-undecanolactam) and dodecano-12-lactam (ω-dodecanolactam).

The lactams can be unsubstituted or at least monosubstituted. In cases where at least monosubstituted lactams are used, these can bear on the nitrogen and/or carbon atoms of the ring two or more substituents that are selected, independently from one another, from the group composed of $C_1$- to $C_{10}$-alkyl, $C_5$- to $C_6$-cycloalkyl and $C_5$- to $C_{10}$-aryl groups.

Examples of suitable $C_1$- to $C_{10}$-alkyl substituents are methyl, ethyl, propyl, isopropyl, n-butyl, sec-butyl and tert-butyl groups. An example of a suitable $C_5$- to $C_6$-cycloalkyl substituent is a cyclohexyl group. Preferred $C_5$- to $C_{10}$-aryl substituents are phenyl and anthranyl groups.

Preferably, unsubstituted lactams are used, wherein γ-lactam (γ-butyrolactam), δ-lactam (δ-valerolactam) and ε-lactam (ε-caprolactam) are preferred. Particularly preferable are δ-lactam (δ-valerolactam) and ε-lactam (ε-caprolactam), wherein ε-caprolactam is most particularly preferred.

According to the invention, the monomer mixture (M) comprises at least one linear aliphatic dicarboxylic acid with 4 to 12 carbon atoms and at least one linear aliphatic diamine with 4 to 12 carbon atoms.

Suitable as the at least one linear aliphatic dicarboxylic acid with 4 to 12 carbon atoms are all linear aliphatic dicarboxylic acids with 4 to 12 carbon atoms known to the person skilled in the art.

For example, the at least one linear aliphatic dicarboxylic acid with 4 to 12 carbon atoms is selected from the group composed of succinic acid (butanedioic acid), glutaric acid (pentanedioic acid), adipic acid (hexanedioic acid), pimelic acid (heptanedioic acid), suberic acid (octanedioic acid), azelaic acid (nonanedioic acid), sebacic acid (decanedioic acid), undecanedioic acid and dodecanedioic acid. Particularly preferred as the at least one linear aliphatic dicarboxylic acid with 4 to 12 carbon atoms is adipic acid (hexanedioic acid).

Suitable as the at least one linear aliphatic diamine with 4 to 12 carbon atoms are all linear aliphatic diamines with 4 to 12 carbon atoms known to the person skilled in the art.

The at least one linear aliphatic diamine with 4 to 12 carbon atoms is for example selected from the group composed of butane-1,4-diamine, pentamethylene diamine (pentane-1,5-diamine), hexamethylene diamine (hexane-1,6-diamine), heptane-1,7-diamine, octane-1,8-diamine, nonane-1,9-diamine, decane-1,10-diamine, undecane-1,11-diamine and dodecane-1,12-diamine. Particularly preferable as the at least one linear aliphatic diamine with 4 to 12 carbon atoms is hexamethylene diamine (hexane-1,6-diamine).

The polymerization of components (A1) and (A2) and additionally component (A3) is known to the person skilled in the art. The polymerization of components (A1) and (A2) and additionally component (A3) can take place in the presence of a catalyst. For the catalyst, the above-described embodiments and preferences for the catalyst for the polymerization of components (A1) and (A2) apply correspondingly.

If component (A) is produced by polymerization of components (A1) and (A2) and additionally component (A3), component (A) comprises structural units derived from component (A1), structural units derived from component (A2) and structural units derived from component (A3).

Component (B)

Component (B) is at least one semicrystalline polyamide.

In the context of the present invention, "semicrystalline" means that the polyamide has a melting enthalpy $\Delta H2_{(B)}$ greater than 45 J/g, preferably greater than 50 J/g and particularly preferably greater than 55 J/g, measured in each case by means of dynamic differential scanning calorimetry (DSC) according to ISO 11357-4:2014.

The at least one semicrystalline polyamide (B) according to the invention thus ordinarily has a melting enthalpy $\Delta H2_{(B)}$ greater than 45 J/g, preferably greater than 50 J/g and particularly preferably greater than 55 J/g, measured in each case by means of dynamic differential scanning calorimetry (DSC) according to ISO 11357-4:2014.

The at least one semicrystalline polyamide (B) according to the invention ordinarily has a melting enthalpy $\Delta H2_{(B)}$ less than 200 J/g, preferably less than 150 J/g and particularly preferably less than 100 J/g, measured in each case by means of dynamic differential scanning calorimetry (DSC) according to ISO 11357-4:2014.

Suitable semicrystalline polyamides (B) generally have an intrinsic viscosity ($IV_{(B)}$) in the range of 90 to 350 ml/g, preferably in the range of 180 to 275 ml/g and particularly preferably in the range of 160 to 250 ml/g, determined in a 0.5 wt % of solution of 96 wt % of sulfuric acid at 25° C., measured according to ISO 307:2013-8.

Subject matter of the present invention is therefore also a polymer film (P) in which component (B) has an intrinsic viscosity ($IV_{(B)}$) in the range of 90 to 350 ml/g, determined in a 0.5 wt % of solution of component (B) in 96 wt % of sulfuric acid at 25° C.

Component (B) according to the invention ordinarily has a melting temperature ($T_{M(B)}$). Preferably, the melting temperature ($T_{M(B)}$) of component (B) is in the range of 170 to 230° C., preferably in the range of 180 to 225° C. and particularly preferably in the range of 185 to 225° C., determined according to ISO 11357-3:2014.

Subject matter of the present invention is therefore also a polymer film (P) in which component (B) has a melting temperature ($T_{M(B)}$), wherein the melting temperature ($T_{M(B)}$) is in the range of 170 to 230° C.

Suitable components (B) have a weight average molecular weight ($M_{W(B)}$) in the range of 500 to 2,000,000 g/mol, preferably in the range of 10,000 to 90,000 g/mol and particularly preferably in the range of 20,000 to 70,000 g/mol. The weight average molecular weight ($M_{W(B)}$) is determined by SEC-MALLS (size exclusion chromatography-multi-angle laser light scattering) according to Chi-san Wu, "Handbook of size exclusion chromatography and related techniques", pg. 19.

Examples of substances suitable as the at least one semicrystalline polyamide (B) are semicrystalline polyamides (B) derived from lactams with 4 to 12 ring members. Also suitable are semicrystalline polyamides (B) obtained by reacting dicarboxylic acids with diamines. As examples of the at least one semicrystalline polyamide (B) derived from lactam, one can mention polyamides derived from polycaprolactam, polycapryllactam and/or polylaurolactam.

In cases where at least one semicrystalline polyamide (B) that is obtainable from dicarboxylic acids and diamines is used, dicarboxylic acids or alkane dicarboxylic acids with 6 to 12 carbon atoms can be used. Aromatic dicarboxylic acids are also suitable.

As examples of dicarboxylic acids, adipic acid, azelaic acid, sebacic acid and dodecanedioic acid can be mentioned.

Examples of suitable diamines include alkane diamines with 4 to 12 carbon atoms and aromatic or cyclic diamines, such as m-xylylene diamine, di-(4-aminophenyl)methane, di-(4-aminocyclohexyl)-methane, 2,2-di-(4-aminophenyl)-propane or 2,2-di-(4-aminocyclohexyl)-propane.

Preferred as component (B) are polycaprolactam (polyamide 6) and copolyamide 6/66 (polyamide 6/6.6). Copolyamide 6/66 preferably has a content of 5 to 95 wt % of caprolactam units, based on the total weight of the copolyamide 6/66.

Furthermore, suitable as the at least one semicrystalline polyamide (P) are polyamides that are obtainable by copolymerization of two or more of the monomers mentioned above or below or mixtures of a plurality of polyamides, wherein any desired mixing ratio can be used. Particularly preferred are mixtures of polyamide 6 with other polyamides, in particular copolyamide 6/66.

The following non-exhaustive list contains the above-mentioned and further suitable semicrystalline polyamides (B) and the monomers contained therein.

AB Polymers:
PA 4 Pyrrolidone
PA 6 ε-Caprolactam
PA 7 Enantholactam
PA 8 Capryllactam
PA 9 9-Aminopelargonic acid
P 11 11-Aminoundecanoic acid
P 12 Laurolactam
AA/BB Polymers:
PA 46 Tetramethylene diamine, adipic acid
PA 66 Hexamethylene diamine, adipic acid
PA 69 Hexamethylene diamine, azelaic acid
PA 610 Hexamethylene diamine, sebacic acid
PA 612 Hexamethylene diamine, decanedicarboxylic acid
PA 613 Hexamethylene diamine, undecanedicarboxylic acid
PA 1212 1,12-Dodecane diamine, decanedicarboxylic acid
PA 1313 1,13-Diaminotridecane, undecanedicarboxylic acid
PA 6T Hexamethylene diamine, terephthalic acid
PA MXD6 m-Xylylene diamine, adipic acid
PA 6/66 (cf. PA 6 and PA 66)
PA 6/12 (cf. PA 6 and PA 12)

Preferably, the at least one semicrystalline polyamide (B) is selected from the group composed of polyamide 6 and polyamide 6/6.6.

Subject matter of the present invention is therefore also a polymer film (P) in which component (B) is selected from the group composed of polyamide 6 and polyamide 6/6.6.

Production of the Polymer Film (P)

The polymer film (P) according to the invention is preferably produced by a method comprising the following steps:

i) provision of at least one polyamide composition (PC), comprising the components
(A) 2 to 30 wt % of at least one amorphous polyamide produced by polymerization of the components
(A1) at least one dicarboxylic acid,
(A2) at least one diamine and
(B) 70 to 98 wt % of at least one semicrystalline polyamide, wherein component (A1) comprises isophthalic acid and component (A2) comprises 2-methyl-1,5-diaminopentane, and wherein the respective percentages by weight are based on the total percentages by weight of components (A) and (B) in molten form in a first extruder, ii) extrusion of the at least one polyamide composition (PC) provided in step i) in molten form from the first extruder through a nozzle to obtain a film of the at least one polyamide composition (PC) in molten form, and iii) cooling of the film of the at least one polyamide composition (PC) obtained in step ii) in molten form, wherein the at least one polyamide composition (PC) solidifies to produce the polymer film (P).

The subject matter of the present invention is thus also a method for producing the polymer film (P) according to the invention, comprising the following steps:

i) provision of at least one polyamide composition (PC), comprising the components
(A) 2 to 30 wt % of at least one amorphous polyamide produced by polymerization of the components
(A1) at least one dicarboxylic acid,
(A2) at least one diamine; and
(B) 70 to 98 wt % of at least one semicrystalline polyamide, wherein component (A1) comprises isophthalic acid and component (A2) comprises 2-methyl-1,5-diaminopentane, and wherein the respective percentages by weight are based on the total percentages by weight of components (A) and (B) in molten form in a first extruder, ii) extrusion of the at least one polyamide composition (PC) provided in step i) in molten form from the first extruder through a nozzle to obtain a film of the at least one polyamide composition (PC) in molten form, and iii) cooling of the film of the at least one polyamide composition (PC) obtained in step ii) in molten form, wherein the at least one polyamide composition (PC) solidifies to produce the polymer film (P).

In step i), the polyamide composition (PC) is provided in molten form in a first extruder.

In the context of the present invention, "a first extruder" means both exactly one first extruder and also two or more first extruders. Ordinarily, the same number of first extruders is used as the number of first layers of the at least one polyamide composition (PC) to be contained in the polymer film (P).

For example, if the polymer film (P) is to contain exactly one first layer of the at least one polyamide composition (PC), exactly one first extruder is used. If the polymer film (P) is to contain exactly two first layers of the at least one polyamide composition (PC), exactly two first extruders are used. If the polymer film (P) is to contain exactly five first layers of the at least one polyamide composition (PC), exactly five first extruders are used.

For example, 1 to 5 first extruders are used, preferably 1 to 3 first extruders and particularly preferably 1 to 2 first extruders.

For the at least one polyamide composition (PC), the above-described embodiments and preferences for the at least one polyamide composition (PC) apply correspondingly.

According to the invention, the at least one polyamide composition (PC) is provided in molten form. In the context of the present invention, "in molten form" means that the at least one polyamide composition (PC) is provided at a temperature that is above the melting temperature ($T_{M(PC)}$) of the at least one polyamide composition (PC). "In molten form" therefore means that the at least one polyamide composition (PC) has a temperature that is above the melting temperature ($T_{M(PC)}$) of the at least one polyamide composition (PC). If the at least one polyamide composition (PC) is in molten form, the at least one polyamide composition (PC) is flowable.

"Flowable" means that the at least one polyamide composition (PC) can be conveyed in the first extruder and that the at least one polyamide composition (PC) can be extruded from the first extruder.

For example, the at least one polyamide composition (PC) is provided in step i) at a temperature in the range of 150 to 300° C., preferably in the range of 200 to 290° C. and particularly preferably in the range of 230 to 280° C., provided in each case that the temperature at which the at least one polyamide composition (PC) is provided is above the melting temperature ($T_{M(PC)}$) of the at least one polyamide composition (PC).

The at least one polyamide composition (PC) can be provided in molten form in the first extruder by all methods known to the person skilled in the art.

For example, the at least one polyamide composition (PC) can be supplied in molten or in solid form to the first extruder. If the at least one polyamide composition (PC) is supplied to the first extruder in solid form, it can be supplied to the first extruder for example as a granulate and/or as a powder. The at least one polyamide composition (PC) is then melted in the first extruder and thus provided in the first extruder in molten form.

If the at least one polyamide composition (PC) is supplied to the first extruder in molten or in solid form, it is first produced by mixing of components (A) and (B) and optionally further components contained in the at least one polyamide composition (PC). The mixing of components (A) and (B) and optionally further components contained in the at least one polyamide composition (PC) can take place by all methods known to the person skilled in the art, for example in an extruder. It is self-evident that the extruder in which components (A) and (B) are first mixed for producing the at least one polyamide composition (PC) can be different from the first extruder in which the at least one polyamide composition (PC) is provided in molten form.

It is also possible to provide the at least one polyamide composition (PC) in the first extruder by bringing components (A) and (B) contained in the at least one polyamide composition (PC) separately from each other into the first extruder in molten form and then compounding (mixing) components (A) and (B) with each other in the first extruder to obtain the at least one polyamide composition (PC) in molten form. Optionally, further components contained in the at least one polyamide composition (PC), such as at least one further polymer and/or at least one bonding agent, can be brought into the first extruder together with components (A) and (B) or separately therefrom.

According to the invention, the at least one polyamide composition (PC) is preferably provided by bringing into the first extruder components (A) and (B), and optionally further components contained in the at least one polyamide composition (PC), together or separately from one another in solid form, for example as a granulate or as a powder. In this case, components (A) and (B), and optionally further components, are melted in the extruder and compounded (mixed) with one another to obtain the at least one polyamide composition (PC) in molten form in the first extruder.

In step ii), the at least one polyamide composition (PC) is extruded in molten form from the first extruder through a nozzle to obtain a film of the at least one polyamide composition (PC) in molten form.

In the context of the present invention, "a nozzle" means both exactly one nozzle and two or more nozzles. Preferred according to the invention is exactly one nozzle.

Suitable as a nozzle are all nozzles known to the person skilled in the art that allow extrusion of a film of the at least one polyamide composition (PC) in molten form. Examples of such nozzles are for example ring nozzles or slot nozzles.

Suitable ring nozzles and slot nozzles are known per se to the person skilled in the art.

For example, if step i1) described below is carried out, it is preferable in step ii) to bring together the at least one polyamide composition (PC) in molten form from the first extruder with the at least one further polymer (P2) in molten form from the further extruder in the nozzle, for example in the ring nozzle or in the slot nozzle.

In particular, in step ii), the at least one polyamide composition (PC) in molten form from the first extruder is brought together with the at least one further polymer (P2) in molten form from the further extruder in the nozzle in such a manner that the film obtained in step ii) of the at least one polyamide composition (PC) and the at least one further polymer (P2), each in molten form, contain at least one first layer of the at least one polyamide composition (PC) in molten form and at least one further layer of the at least one further polymer (P2) in molten form.

For example, the thickness of the film of the at least one polyamide composition (PC) in molten form is in the range of 0.1 µm to 1 mm, preferably in the range of 5 to 500 µm and particularly preferably in the range of 20 to 100 µm.

The film of the at least one polyamide composition (PC) in molten form can for example be a flat film or a tubular film. A tubular film is ordinarily obtained when a ring nozzle is used as a nozzle, and a flat film is obtained when a slot nozzle is used as a nozzle.

In step iii), the film obtained in step ii) of the at least one polyamide composition (PC) in molten form is cooled. This causes the at least one polyamide composition (PC) to harden, thus obtaining the polymer film (P).

For cooling of the film of the at least one polyamide composition (PC) in molten form, all methods known to the person skilled in the art are suitable. For example, the film of the at least one polyamide composition (PC) in molten form can be cooled by air or water cooling or by contact with a cold surface.

In step iii), for example, the film of the at least one polyamide composition (PC) in molten form is cooled to a temperature below the melting temperature ($T_{M(PC)}$) of the at least one polyamide composition (PC) to obtain the polymer film (P). Preferably, in step iii), the film of the at least one polyamide composition (PC) in molten form is cooled to a temperature below the glass transition temperature ($T_{G(PC)}$) of the at least one polyamide composition (PC).

For example, the film of the at least one polyamide composition (PC) in molten form is cooled to a temperature in the range of 0 to 100° C., preferably in the range of 10 to 80° C. and particularly preferably in the range of 15 to 70° C., wherein the temperature to which the film of the at least one polyamide composition (PC) in molten form is cooled is below the melting temperature ($T_{M(PC)}$), preferably below the glass transition temperature ($T_{G(PC)}$) of the at least one polyamide composition (PC).

Subject matter of the present invention is therefore also a method for producing a polymer film (P) in which in step iii), the film of the at least one polyamide composition (PC) in molten form is cooled to a temperature below the melting temperature ($T_{M(PC)}$) of the at least one polyamide composition (PC).

For the polymer film (P) obtained in step iii), the embodiments and preferences described above for the polymer film (P) according to the invention apply correspondingly.

Steps ii) and iii) can be carried out successively or simultaneously.

Preferably, a step i1) in which at least one further polymer (P2) in molten form is provided in a further extruder is additionally carried out.

In this case, the method for producing the polymer film (P) comprises the following steps:

i) provision of at least one polyamide composition (PC), comprising the components (A) 2 to 30 wt % of at least one amorphous polyamide produced by polymerization of the components (A1) at least one dicarboxylic acid, (A2) at least one diamine and (B) 70 to 98 wt % of at least one semicrystalline polyamide, wherein component (A1) comprises isophthalic acid and component (A2) comprises 2-methyl-1,5-diaminopentane, and wherein the respective percentages by weight are based on the total percentages by weight of components (A) and (B) in molten form in a first extruder, i1) provision of at least one further polymer (P2) in molten form in a further extruder, ii) extrusion of the at least one polyamide composition (PC) provided in step i) in molten form from the first extruder through a nozzle and extrusion of the at least one further polymer (P2) provided in step i1) in molten form from the further extruder through the nozzle to obtain a film of the at least one polyamide composition (PC) and the at least one further polymer (P2), each in molten form, and iii) cooling of the film of the at least one polyamide composition (PC) obtained in step ii) and the at least one further polymer (P2), each in molten form, wherein the at least one polyamide composition (PC) and/or the at least one further polymer (P2) solidifies to produce the polymer film (P).

In step i1), the at least one further polymer (P2) in molten form is provided in a further extruder.

In the context of the present invention, "a further extruder" means both exactly one further extruder and two or more further extruders. Two or more further extruders are preferred.

Preferably, the number of further extruders used is the same as the number of further layers of the at least one further polymer (P2) to be contained in the polymer film (P). For example, 1 to 10 further extruders are used, preferably 1 to 8 further extruders and particularly preferably 1 to 6 further extruders.

For example, if the polymer film (P) is to contain exactly one further layer of the at least one further polymer (P2), exactly one further extruder is used. If the polymer film (P) is to contain exactly two further layers of the at least one further polymer (P2), exactly two further extruders are used. If the polymer film (P) is to contain exactly five further layers of the at least one further polymer (P2), exactly five further extruders are used.

For the further extruder, the above-described embodiments and preferences for the first extruder apply correspondingly.

For the at least one further polymer (P2), the above-described embodiments and preferences apply correspondingly to the at least one further polymer (P2).

According to the invention, the at least one further polymer (P2) is provided in step i1) in molten form. "In molten form" means that the at least one further polymer (P2) is provided at a temperature above the melting point ($T_{M(P2)}$) of the at least one further polymer (P2). "In molten form" therefore means that the at least one further polymer (P2) is at a temperature above the melting temperature ($T_{M(P2)}$) of the at least one further polymer (P2). If the at least one further polymer (P2) is in molten form, the at least one further polymer (P2) is flowable.

"Flowable" means that the at least one further polymer (P2) can be supplied in the further extruder and that the at least one further polymer (P2) can be extruded from the further extruder.

For example, the at least one further polymer (P2) is provided in step i1) at a temperature in the range of 120 to 350° C., preferably in the range of 130 to 300° C. and particularly preferably in the range of 140 to 250° C., provided in each case that the temperature at which the at least one further polymer (P2) is provided is above the melting temperature ($T_{M(P2)}$) of the at least one further polymer (P2).

The at least one further polymer (P2) can be provided in molten form in the further extruder by all methods known to the person skilled in the art.

For example, the at least one further polymer (P2) can be supplied in molten or in solid form to the further extruder. If the at least one further polymer (P2) is supplied to the further extruder in solid form, it can be supplied to the further extruder for example as a granulate and/or as a powder. In this case, the at least one further polymer (P2) is melted in the further extruder and thus provided in molten form in the further extruder.

Step i1) is ordinarily carried out simultaneously with step i).

For steps i), ii) and iii), the above-described embodiments and preferences for steps i), ii) and iii) apply correspondingly.

The film obtained in step ii) of the at least one polyamide composition (PC) and the at least one further polymer (P2), each in molten form, comprises the at least one polyamide composition (PC) as the at least one first layer and the at least one further polymer (P2) as the at least one further layer. Ordinarily, the film obtained in step ii) comprises the same number of first layers of the at least one polyamide composition (PC) in molten form as the number of first extruders used in step i) and the same number of further layers of the at least one further polymer (P2) in molten form as the number of further extruders in used step i1).

It is self-evident that when step i1) is carried out, the polymer film (P) obtained in step iii) is a multilayer film.

The polymer film (P) is preferably stretched. The polymer film (P) can be stretched after step iii), and it is also possible to stretch the polymer film (P) during step iii), i.e. during cooling of the film of the at least one polyamide composition (PC) and optionally of the at least one further polymer (P2).

Subject matter of the present invention is therefore also a method in which the following step is additionally carried out:

iv) stretching of the polymer film (P) to obtain a stretched polymer film (sP).

Steps iii) and iv) can be carried out successively or simultaneously.

In stretching of the polymer film (P), the polymer chains of component (B) contained in the at least one polyamide composition (PC) are oriented, and the crystallinity of component (B) can be increased.

Moreover, it is also possible for the polymer chains of the at least one further polymer (P2) optionally contained in the polymer film (P) to be oriented in stretching. In this manner, the crystallinity of the at least one further polymer (P2) can also be increased.

The stretching can take place by all of the methods known to the person skilled in the art.

For example, the polymer film (P) can be stretched by guiding it over at least one roller, preferably a roller system, or by stretching it in the direction of its width. If the polymer film (P) is obtained as a tube, it is also possible for the polymer film (P) to be stretched by blowing air into the tube of the polymer film (P) and for the polymer film (P) to be stretched in this manner. Of course, combinations of the methods are also possible.

If the polymer film (P) is guided over at least one roller, preferably a roller system, the polymer film (P) is stretched in the extrusion direction, i.e. in the direction of its length. If the polymer film (P) is stretched in the direction of its width, however, it is stretched perpendicularly to the extrusion direction.

If the polymer film (P) is guided for stretching over at least one roller, preferably a roller system, the polymer chains of component (B) and optionally of the at least one further polymer (P2) are oriented parallel to the direction of stretching. In this case, the stretched polymer film (sP) obtained is uniaxially oriented. The stretched polymer film (sP) obtained will also be uniaxially oriented if the polymer film (P) is stretched by stretching in the direction of its width. In this case as well, the polymer chains of component (B), and optionally of the at least one further polymer (P2), are oriented parallel to the direction of stretching.

"Uniaxially oriented" means that the polymer chains are essentially oriented in one direction.

If the polymer film (P) is guided over a roller system for stretching and stretched in the direction of its width, the polymer chains of component (B) and optionally of the at least one further polymer (P2) are oriented parallel to the two directions in which stretching is carried out. In this case, the stretched polymer film (sP) obtained is biaxially oriented.

"Biaxially oriented" means that the polymer chains are essentially oriented in two different directions that are preferably perpendicular to each other.

If the polymer film (P) is obtained as a tube and the polymer film (P) is stretched by blowing air into the tube of the polymer film (P), the stretched polymer film (sP) obtained will be uniaxially oriented.

If the above-described methods for stretching of the polymer film (P) are combined, for example if the polymer film (P) is obtained as a tube, the polymer film (P) is stretched by blowing air into the tube of the polymer film (P), simultaneously guided over rollers, and also stretched in the process, the stretched polymer film (sP) obtained is biaxially oriented.

The polymer film (P) is ordinarily stretched at a temperature that is above the glass transition temperature ($T_{G(PC)}$) of the at least one polyamide composition (PC) and the below the melting temperature ($T_{(M(PC)}$) of the at least one polyamide composition (PC). If the polymer film (P) is a multilayer film, it is further preferred that the polymer film (P) be stretched at a temperature that is below the melting temperature of the at least one further polymer (P2), particularly preferably at a temperature that is below the melting temperature of the at least one further polymer (P2) that melts at the lowest temperature.

The polymer film (P) according to the invention can for example be produced in a casting process, a blow molding process, a biaxially oriented polyamide film process (BOPA process) or a multi-blow molding process.

Subject matter of the present invention is therefore also a polymer film (P) produced in a casting process, a blow molding process, a biaxially oriented polyamide film process or a multi-blow molding process.

The casting process, blow molding process, biaxially oriented polyamide film process and multi-blow molding process are known per se to the person skilled in the art. Ordinarily, the polymer film (P) is stretched in these methods so that a stretched polymer film (sP) is obtained.

A casting process for producing the polymer film (P) preferably comprises the following steps i-c) to iv-c):

i-c) provision of at least one polyamide composition (PC), comprising the components (A) 2 to 30 wt % of at least one amorphous polyamide produced by polymerization of the components (A1) at least one dicarboxylic acid, (A2) at least one diamine; and (B) 70 to 98 wt % of at least one semicrystalline polyamide, wherein component (A1) comprises isophthalic acid and component (A2) comprises 2-methyl-1,5-diaminopentane, and wherein the respective percentages by weight are based on the total percentages by weight of components (A) and (B) in molten form in a first extruder, ii-c) extrusion of the at least one polyamide composition (PC) provided in step i-c) in molten form from the first extruder through a nozzle to obtain a film of the at least one polyamide composition (PC) in molten form, iii-c) cooling of the film of the at least one polyamide composition (PC) obtained in step ii-c) in molten form, wherein the at least one polyamide composition (PC) solidifies to produce the polymer film (P), iv-c) stretching of the polymer film (P) obtained in step iii-c) by guiding the polymer film (P) over at least one roller, preferably over a roller system, to obtain a stretched polymer film (sP).

For steps i-c) to iii-c) of the casting process, the above-described embodiments and preferences for steps i) to iii) of the method for producing the polymer film (P) apply correspondingly.

The nozzle used in the casting process in step ii-c) is ordinarily a slot nozzle. The film of the at least one polyamide composition (PC) in molten form obtained in step ii-c) is thus preferably a flat film, and the polymer film (P) obtained in step iii-c) and the stretched polymer film (sP) obtained in step iv-c) are therefore preferably flat films.

In the casting process, steps iii-c) and iv-c) can be carried out successively or simultaneously. Preferably, in the casting process, steps iii-c) and iv-c) are carried out simultaneously, and particularly preferably, steps iii-c) and iv-c) are carried out simultaneously and immediately after ii-c).

Moreover, it is preferable in the casting process for the at least one roller, and preferably the roller system, used in step iv-c) to be cooled during step iv-c).

A blow molding process for producing the polymer film (P) preferably comprises the following steps i-b) through iv-b):

i-b) provision of at least one polyamide composition (PC), comprising the components (A) 2 to 30 wt % of at least one amorphous polyamide produced by polymerization of the components (A1) at least one dicarboxylic acid, (A2) at least one diamine; and (B) 70 to 98 wt % of at least one semicrystalline polyamide, wherein component (A1) comprises isophthalic acid and component (A2) comprises 2-methyl-1,5-diaminopentane, and wherein the respective percentages by weight are based on the total percentages by weight of components (A) and (B) in molten form in a first extruder, ii-b) extrusion of the at least one polyamide composition (PC) in molten form provided in step i-b) from the first extruder through a nozzle that is a ring nozzle to obtain a tubular film of the at least one polyamide composition (PC) in molten form, iii-b) cooling of the tubular film of the at least one polyamide composition (PC) in molten form obtained in step ii-b), wherein the at least one polyamide composition (PC) solidifies to produce the polymer film (P), and iv-b) stretching of the polymer film (P) obtained in step iii-b) by blowing air into the tube of the polymer film (P) to obtain a stretched polymer film (sP).

For steps i-b) through iii-b) of the blow molding process, the above-described embodiments and preferences for steps i) through iii) of the method for producing the polymer film (P) apply correspondingly.

As a nozzle in step ii-b) of the blow molding process, a stack die, a helical distributor, or a mixed form of the two is preferably used. These nozzles are known to the person skilled in the art, and are described for example in "Blown Film Extrusion" by Kirk Cantor, 2nd Edition, Carl Hanser Verlag, Munich 2011.

In the blow molding process, steps iii-b) and iv-b) can be carried out simultaneously or successively. In the blow molding process, steps iii-b) and iv-b) are preferably carried out simultaneously.

A biaxially oriented polyamide film method for producing the polymer film (P) preferably comprises the following steps i-o) through iv-o):

i-o) provision of at least one polyamide composition (PC), comprising the components (A) 2 to 30 wt % of at least one amorphous polyamide produced by polymerization of the components (A1) at least one dicarboxylic acid, (A2) at least one diamine; and (B) 70 to 98 wt % of at least one semicrystalline polyamide, wherein component (A1) comprises isophthalic acid and component (A2) comprises 2-methyl-1,5-diaminopentane, and wherein the respective percentages by weight are based on the total percentages by weight of components (A) and (B) in molten form in a first extruder, ii-o) extrusion of the at least one polyamide composition (PC) provided in step i-o) in molten form from the first extruder through a nozzle to obtain a film of the at least one polyamide composition (PC) in molten form, iii-o) cooling of the film of the at least one polyamide composition (PC) obtained in step ii-o) in molten form, wherein the at least one polyamide composition (PC) solidifies to produce the polymer film (P), and iv-o) stretching of the in polymer film (P) obtained in step iii-o) by guiding the polymer film (P) over at least one roller, preferably a roller system, and stretching it in the direction of its width to obtain the stretched polymer film (sP).

For steps i-o) through iii-o) of the biaxially oriented polyamide film method, the above-described embodiments and preferences for steps i) through iii) of the method for producing the polymer film (P) apply correspondingly.

The nozzle used in the biaxially oriented polyamide film method in step ii-o) is ordinarily a slot nozzle. The film of the at least one polyamide composition (PC) in molten form obtained in step ii-o) is thus preferably a flat film, and the polymer film (P) obtained in step iii-o) and the stretched polymer film (sP) obtained in step iv-o) are therefore preferably flat films.

In the biaxially oriented polyamide film method, steps iii-o) and iv-o) can be carried out successively or simultaneously, and steps iii-o) and iv-o) are preferably carried out successively. In particular, in the biaxially oriented polyamide film method, steps iii-o) and iv-o) are carried out successively, and the polymer film (P) obtained in in step iii-o) is heated before step iv-o). In this case, it is preferable for the polymer film (P) to be heated before step iv-o) to a temperature that is above the glass transition temperature ($T_{G(PC)}$) of the at least one polyamide composition (PC) contained in the polymer film (P) and below the melting temperature ($TM_{(PC)}$) of the at least one polyamide composition (PC) contained in the polymer film (P). In step iv-o), the polymer film (P) is then preferably stretched at the temperature to which it is warmed before step iv-o).

A multi-blow molding process for producing the polymer film (P) preferably comprises the following steps i-m) through iv-m):

i-m) provision of at least one polyamide composition (PC), comprising the components (A) 2 to 30 wt % of at least one amorphous polyamide produced by polymerization of the components (A1) at least one dicarboxylic acid, (A2) at least one diamine; and (B) 70 to 98 wt % of at least one semicrystalline polyamide, wherein component (A1) comprises isophthalic acid and component (A2) comprises 2-methyl-1,5-diaminopentane, and wherein the respective percentages by weight are based on the total percentages by weight of components (A) and (B) in molten form in a first extruder, ii-m) extrusion of the at least one polyamide composition (PC) in molten form provided in step i-m) from the first extruder through a nozzle that is a ring nozzle to obtain a tubular film of the at least one polyamide composition (PC) in molten form, iii-m) cooling of the tubular film of the at least one polyamide composition (PC) in molten form obtained in step ii-m), wherein the at least one polyamide composition (PC) solidifies to produce the polymer film (P), and iv-m) stretching of the polymer film (P) obtained in step iii-m) by blowing air into the tube of the polymer film and simultaneously guiding the polymer film (P) over at least one roller, preferably a roller system, to obtain a stretched polymer film (sP).

For steps i-m) through iii-m) of the multi-blow molding process, the above-described embodiments and preferences for steps i) through iii) of the method for producing the polymer film (P) apply correspondingly.

Preferably, the tubular film of the at least one polyamide composition (PC) in molten form is cooled in step iii-m) in a water bath.

In the multi-blow molding process, steps iii-m) and iv-m) can be carried out simultaneously or successively, and steps iii-m) and iv-m) are preferably carried out successively. In particular, steps iii-m) and iv-m) are preferably carried out successively, and polymer film (P) obtained in step iii-m) is preferably heated before step iv-m). In this case, it is preferable for the polymer film (P) to be heated before step iv-m) to a temperature that is above the glass transition temperature ($T_{G(PC)}$) of the at least one polyamide composition (PC) contained in the polymer film (P) and below the melting temperature ($T_{M(PC)}$) of the at least one polyamide composition (PC) contained in the polymer film (P). In this case, the polymer film (P) is preferably stretched in step iv-m) at the temperature to which it was heated before step iv-m).

It is self-evident that in the casting process, the blow molding process, the biaxially oriented polyamide film process and the multi-blow molding process, step i1), in which at least one further polymer (P2) is provided in a further extruder in molten form, can also be carried out, and that in this case, in accordance with step ii) of the method for producing the polymer film (P), a film of the at least one polyamide composition (PC) and the at least one further polymer (P2) can be obtained in step ii-c), step ii-b), step ii-o) and step ii-m), in each case in molten form, and that this film is cooled in accordance with step iii) of the method for producing the polymer film (P) in step iii-c), step iii-b), step iii-o) and step iii-m).

For optionally conducted step i1), the above-described embodiments and preferences for optionally conducted step i1) of the method for producing the polymer film (P) apply correspondingly.

Preferably, no step i1) is carried out in the biaxially oriented polyamide film method. Preferably, therefore, no further polymer (P2) is provided in a further extruder in the biaxially oriented polyamide film method.

Packaging of Food Products

The polymer film (P) according to the invention can be used in a method for packaging food products.

Subject matter of the present invention is therefore also the use of the polymer film (P) according to the invention for packaging food products.

For example, the method comprises the following steps for packaging food products:

a) provision of a food product enclosed by at least one polymer film (P) according to the invention, wherein the at least one polymer film (P) has a first temperature (T1), and b) heating of the at least one polymer film (P) to a second temperature (T2) in the range of 60 to 150° C., causing the at least one polymer film (P) to shrink to obtain the food product, which is enclosed by the at least one polymer film (P).

Subject matter of the present invention is therefore also a method for packaging food products comprising the following steps:

a) provision of a food product enclosed by at least one polymer film (P) according to one of claims 1 through 13, wherein the at least one polymer film (P) has a first temperature (T1), and b) heating of the at least one polymer film (P) to a second temperature (T2) in the range of 60 to 150° C., and causing the at least one polymer film (P) to shrink to obtain the food product, which is enclosed by the at least one polymer film (P).

In step a), the food product enclosed by at least one polymer film (P) is provided.

For the polymer film (P), the above-described embodiments and preferences for the polymer film (P) apply correspondingly.

Preferably, at least one stretched polymer film (sP) is used as the polymer film (P) in the method for packaging food products. For the at least one stretched polymer film (sP), the above-described embodiments and preferences for the stretched polymer film (sP) apply correspondingly.

All known food products are suitable as food products, with cheese products, meat products and sausage products being particularly suitable.

In the context of the present invention, "enclosed by the at least one polymer film (P)" means that at least 50%, preferably at least 80% and particularly preferably 100% of the surface of the food product is covered by the at least one polymer film (P). "Covered" means that the at least one polymer film (P) and the surface of the food product can be in direct contact with each other, and it is also possible for at least some air to be present between the surface of the food product and the at least one polymer film (P).

In step a), the at least one polymer film (P) comprises a first temperature (T1). The first temperature (T1) is preferably below the glass transition temperature ($T_{G(PC)}$) of the at least one polyamide composition (PC) contained in the at least one polymer film (P). For example, the at least one polymer film (P) has a first temperature (T1) that is in the range of −10 to 50° C., preferably in the range of 0 to 40° C. and particularly preferably in the range of 10 to 30° C.

Subject matter of the present invention is therefore also a method for packaging food products, wherein the first temperature (T1) is below the glass transition temperature ($T_{G(PC)}$) of the at least one polyamide composition (PC) contained in the at least one polymer film (P).

Subject matter of the present invention is also a method for packaging food products, wherein the first temperature (T1) is in the range of −10 to 50° C.

In step b), the at least one polymer film (P) is heated to a second temperature (T2). The second temperature (T2) is therefore above the first temperature (T1) of the polymer film (P).

Preferably, the second temperature (T2) is above the glass transition temperature ($T_{G(PC)}$) of the at least one polyamide composition (PC) contained in the at least one polymer film (P). For example, the second temperature (T2) is in the range of 60 to 150° C., preferably in the range of 80 to 120° C. and particularly preferably in the range of 90 to 110° C.

Subject matter of the present invention is therefore also a method for packaging food products, wherein the second temperature (T2) is above the glass transition temperature ($T_{G(PC)}$) of the polyamide composition (PC) contained in the at least one polymer film (P).

Subject matter of the present invention is also a method for packaging food products in which the second temperature (T2) is in the range of 60 to 150° C.

The at least one polymer film (P) can be heated to the second temperature (T2) according to all methods known to the person skilled in the art. For example, it can be heated to the second temperature (T2) by means of water vapor or hot air.

In step b), the at least one polymer film (P) shrinks. The at least one polymer film (P) can already shrink while it is being heated to the second temperature (T2). It is also possible for the at least one polymer film (P) to shrink only when it is at the second temperature (T2).

In the context of the present invention, "shrinking" is understood to mean that the volume of the at least one polymer film (P) is less than the volume of the at least one polymer film (P) at the first temperature (T1). For example, the volume of the at least one polymer film (P) is 10 to 80% less, preferably 20 to 70% less and particularly preferably 30 to 60% less, based in each case on the volume of the at least one polymer film (P) at the first temperature (T1).

The at least one shrunken polymer film (P) enclosing the food product has a particularly high oxygen barrier and therefore protects the food product particularly well from the penetration of oxygen. This favorable oxygen impermeability is also retained at high humidity and high temperatures, for example above 25° C.

The present invention will be explained by means of the following examples, without limiting the invention to said examples.

Measurement Methods:

The intrinsic viscosity of the polyamide was determined in a 0.5 wt % of solution in 96 wt % of sulfuric acid at 25° C. according to EN ISO 307: 2007+Amd 1: 2013.

Molecular weight Mw was determined by SEC-MALLS (Chi-san Wu, Handbook of size exclusion chromatography and related techniques, pg. 19).

The glass transition temperatures and melting temperatures were determined according to ISO 11357-1: 2009, ISO 11357-2: 2013 and ISO 11357-3: 2011. For this purpose, two hot runs were conducted, and the glass transition and melting temperatures were determined based on the second hot run.

The oxygen transmission rate at 40° C. was determined according to ASTM D 3985-05 (2010) at 0% relative humidity.

The tear and yield stress was determined according to ISO 527-3: 2003.

The puncture resistance was determined according to the standard for food product foils DIN EN 14477: 2004.

Ingredients:

1.) A PA6 from the firm BASF SE® sold under the brand name Ultramid B40L. It had a measured intrinsic viscosity of 250, an absolute molecular weight Mw of 56200 and a melting point of 219.8° C.

2.) A PA6 from the firm BASF SE® sold under the brand name Ultramid B33L. It had a measured intrinsic viscosity of 195, an absolute molecular weight Mw of 42600 and a melting point of 220.2° C.

3.) A PA6/6.6 from the firm BASF SE® sold under the brand name Ultramid C40L. It had a measured intrinsic viscosity of 250, an absolute molecular weight Mw of 55300 and a melting point of 189.6° C.

4.) A PA6/6.6 from the firm BASF SE® sold under the brand name Ultramid C33L. It had a measured intrinsic viscosity of 195, an absolute molecular weight Mw of 42800 and a melting point of 195° C.

5.) A PA 6I/6T from the firm EMS-Chemie Holding AG® sold under the brand name Grivory G21. It had a measured intrinsic viscosity of 85, an absolute molecular weight of 23,400 and a glass transition temperature of 125° C.

6.) An LDPE (low density polyethylene) from the firm LyondellBasell® sold under the brand name Lupolen 2420 F. It had an MFR (190° C./2.16 kg) of 0.75 g/10 min according to the technical data sheet.

7.) An LLDPE (linear low density polyethylene) from the firm DOW® sold under the brand name DOWLEX 2045S. It had an MFR (melt flow rate) (190° C./2.16 kg) of 1.0 g/10 min according to the technical data sheet.

8.) An EVA (ethylene vinyl acetate) from the firm ExxonMobil® sold under the brand name Escorene Ultra FL 00119. It had an MFI (melt flow index) (190° C./2.16 kg) of 0.65 g/10 min according to the technical data sheet.

9.) An LDPE from the firm LyondellBasell® sold under the brand name Lupolen 3020 K. It had an MFR (190° C./2.16 kg) of 4 g/10 min according to the technical data sheet.

10.) A TIE (bonding agent; maleic anhydride grafted polyethylene) from the firm DuPont® sold under the brand name Bynel 4104. It had an MFR (190° C./2.16 kg) of 1.1 g/10 min according to the technical data sheet.

11.) A TIE from the firm DuPont® sold under the brand name Bynel 4105. It had an MFR (190° C./2.16 kg) of 4 g/10 min according to the technical data sheet.

12.) A component A according to the invention, produced from 100 mol % of isophthalic acid and 100 mol % of 2-methyl-1,5-diaminopentane. The thermoplastic showed a glass transition temperature of 141° C. and an intrinsic viscosity of 84.

13.) A component A according to the invention, produced from 60 mol % of terephthalic acid, 40 mol % of isophthalic acid and 100 mol % of 2-methyl-1,5-diaminopentane. The thermoplastic showed a glass transition temperature of 146° C. and an intrinsic viscosity of 86.

14.) A component A according to the invention, produced from 50 mol % of terephthalic acid, 50 mol % of isophthalic acid, 50 mol % of 2-methyl-1,5-diaminopentane and 50 mol % of hexamethylene diamine. The thermoplastic showed a glass transition temperature of 139° C. and an intrinsic viscosity of 86.

Production of the multilayer films according to the invention by the blow molding method:

The multilayer films were produced on a 7-layer blown film system from the firm Collin® with a nozzle head diameter of 180 mm. Of the 7 extruders, 6 had a diameter of 30 mm and one a diameter of 45 mm. The films had a thickness of 100 μm and the layers a layer thickness of 15/14/14/14/14/14/15 μm in the multilayer films.

V-A: A multilayer film with the structure PE //PE //TIE //PA //TIE //PE //PE, wherein a Lupolen 2420 F from the firm LyondellBasell® was used as a PE and a Bynel 4104 from the firm DuPont® was used as a TIE. As a polyamide composition (PC), a mixture of 20 wt % of PA6 and 80 wt % of ingredient 12.) was used. The PA6 was an Ultramid B40L from the firm BASF SE®.

V-B: A multilayer film with the structure PE //PE //TIE //PA //TIE //PE //PE, wherein a Lupolen 2420 F from the firm LyondellBasell® was used as a PE and a Bynel 4104 from the firm DuPont® was used as a TIE. As a polyamide composition (PC), a mixture of 20 wt % of PA6 and 80 wt % of PA6I/6T was used. The PA6 was an Ultramid B40L from the firm BASF SE® and the PA6I/6T a Grivory G21 from the firm EMS®.

V-C: A multilayer film with the structure PE //PE //TIE //PA //TIE //PE //PE, wherein a Lupolen 2420 F from the firm LyondellBasell® was used as a PE and a Bynel 4104 from the firm DuPont® was used as a TIE. As a polyamide composition (PC), a mixture of 80 wt % of PA6 and 20 wt % of PA6I/6T in a mixing ratio of 8:2 was used. The PA6 was an Ultramid B33L from the firm BASF SE® and the PA6I/6T a Grivory G21 from the firm EMS D: A multilayer film with the structure PE //PE //TIE //PA //TIE //PE //PE, wherein a Lupolen 2420 F from the firm LyondellBasell® was used as a PE and a Bynel 4104 from the firm DuPont® was used as a TIE. As a polyamide composition (PC), a mixture of 75 wt % of PA6 (Ultramid B40L from the firm BASF SE®) and 25 wt % of ingredient 12.) was used.

E: A multilayer film with the structure PE //PE //TIE //PA //TIE //PE //PE, wherein a Lupolen 2420 F from the firm LyondellBasell® was used as a PE and a Bynel 4104 from the firm DuPont® was used as a TIE. As a polyamide composition (PC), a mixture of 85 wt % of PA6/6.6 (Ultramid C40L from the firm BASF SE®) and 15 wt % of ingredient 13.) was used.

F: A multilayer film with the structure EVA //PA //TIE //PE //LLDPE //PE //PE, wherein an Escorene Ultra FL 00119 from the firm ExxonMobil® was used as an EVA and a Bynel 4104 from the firm DuPont® was used as a TIE. As a polyamide composition (PC), a mixture of 90 wt % of PA6/6.6 (Ultramid C40L from the firm BASF SE®) and 10 wt % of ingredient 14.) was used. As a PE, a Lupolen 2420 F from the firm LyondellBasell® was used, and as a LLDPE, a DOWLEX 2045S from the firm DOW® was used.

TABLE 1

Properties of the mono- and multilayer films produced by the blow molding method:

| Films | V-A | V-B | V-C | D | E | F |
|---|---|---|---|---|---|---|
| Puncture resistance [N/mm] | 3.4 | 5.9 | 6.8 | 7.1 | 7.6 | 10.2 |
| Tear stress [%] | 274 | 318 | 474 | 494 | 547 | 511 |
| Oxygen transmission rate [cm³/(m² * d)] | 187 | 189 | 186 | 178 | 182 | 183 |
| Yield stress [MPa] | 21.1 | 23.1 | 23.9 | 25.7 | 27.5 | 27.8 |

Production of the multi- and monolayer films produced by the casting process:

The multilayer films were produced on a 7-layer cast film system from the firm Collin® with a nozzle head width of 800 mm. Of the 7 extruders, 6 had a diameter of 30 mm and one a diameter of 45 mm. The films had a thickness of 100 μm and the layers a layer thickness of 15/14/14/14/14/14/15 μm in the multilayer films. The monolayer film was produced on the same system with only one extruder with a diameter of 45 mm.

V-Ai): A multilayer film with the structure PE //PE //TIE //PA //TIE //PE //PE, wherein a Lupolen 3020 K from the firm LyondellBasell® was used as a PE and a Bynel 4105 from the firm DuPont® was used as a TIE. As a polyamide composition (PC), a mixture of 20 wt % of PA6 and 80 wt % of ingredient 12.) was used. The PA6 was an Ultramid B33L from the firm BASF SE®.

V-Bi): A multilayer film with the structure PE //PE //TIE //PA //TIE //PE //PE, wherein a Lupolen 3020 K from the firm LyondellBasell®, was used as a PE and a Bynel 4105 from the firm DuPont® was used as a TIE. As a polyamide composition (PC), a mixture of 20 wt % of PA6 and 80 wt % of PA6I/6T was used. The PA6 was an Ultramid B33L from the firm BASF SE® and the PA6I/6T a Grivory G21 from the firm EMS®.

V-Ci): A multilayer film with the structure PE //PE //TIE //PA //TIE //PE //PE, wherein a Lupolen 3020 K from the firm LyondellBasell® was used as a PE and a Bynel 4105 from the firm DuPont® was used as a TIE. As a polyamide composition (PC), a mixture of 80 wt % of PA6 and 20 wt % of PA6I/6T was used. The PA6 was an Ultramid B33L from the firm BASF SE® and the PA6I/6T a Grivory G21 from the firm EMS®. The mixing ratio of Ultramid B33L to Grivory G21 was 8:2.

Di): A multilayer film with the structure PE //PE //TIE //PA //TIE //PE //PE, wherein a Lupolen 3020 K from the firm LyondellBasell®, was used as a PE and a Bynel 4105 from the firm DuPont® was used as a TIE. As a polyamide composition (PC), a mixture of 75 wt % of PA6 (Ultramid B33L from the firm BASF SE®) and 25 wt % of ingredient 12.) was used.

Ei): A multilayer film with the structure PE //PE //TIE //PA //TIE //PE //PE, wherein a Lupolen 3020 K from the firm LyondellBasell® was used as a PE and a Bynel 4105 from the firm DuPont® was used as a TIE. As a polyamide composition (PC), a mixture of 85 wt % of PA6/6.6 (Ultramid C33L from the firm BASF SE®) and 15 wt % of ingredient 13.) was used.

Fi): A multilayer film with the structure EVA //PA //TIE //PE //LLDPE //PE //PE, wherein an Escorene Ultra FL 00119 from the firm ExxonMobil® was used as an EVA and a Bynel 4105 from the firm DuPont® was used as a TIE. As a polyamide composition (PC), a mixture of 90 wt % of PA6/6.6 (Ultramid C33L from the firm BASF SE®) and 10 wt % of ingredient 14.) was used. A Lupolen 3020 K from the firm LyondellBasell® was used as a PE and a DOWLEX 2045S from the firm DOW® was used as an LLDPE.

Gi): A monolayer film composed of a mixture of 80 wt % of PA6 (Ultramid C33L from the firm BASF SE®) and 20 wt % of ingredient 12.).

TABLE 2

Properties of the mono- and multilayer films produced in the casting process:

| Films | V-Ai.) | V-Bi.) | V-Ci.) | Di.) | Ei.) | Fi.) | Gi.) |
|---|---|---|---|---|---|---|---|
| Puncture resistance [N/mm] | 6.2 | 6.3 | 6.6 | 7.2 | 8.2 | 10.2 | 28.1 |
| Tear stress [%] | 334 | 301 | 386 | 489 | 458 | 501 | 424 |

TABLE 2-continued

Properties of the mono- and multilayer films produced in the casting process:

| Films | V-Ai.) | V-Bi.) | V-Ci.) | Di.) | Ei.) | Fi.) | Gi.) |
|---|---|---|---|---|---|---|---|
| Oxygen transmission rate [cm³/(m² * d)] | 138 | 210 | 205 | 150 | 172 | 196 | 83 |
| Yield stress [MPa] | 17.1 | 19.1 | 21.8 | 25.9 | 23.4 | 30.1 | 55.0 |

The invention claimed is:

1. A multilayer polymer film (P), comprising:
   a polyamide composition layer comprising at least one polyamide composition (PC), and
   at least one (P2) layer comprising at least one polymer selected from the group consisting of a polyolefin, a poly(ethylene vinyl alcohol), a poly(ethylene vinyl acetate), a polyethylene terephthalate, a polyvinylidene chloride and a maleic anhydride grafted polyolefin;
   wherein the at least one polyamide composition (PC) comprises:
   (A) 2 to 30 wt % of at least one amorphous polyamide produced by polymerization of the components:
      (A1) at least one dicarboxylic acid,
      (A2) at least one diamine; and
   (B) 70 to 98 wt % of at least one semicrystalline polyamide,
   wherein:
   the component (A1) comprises isophthalic acid and the component (A2) comprises 2-methyl-1,5-diaminopentane; and
   the respective percentages by weight are based on the total percentages by weight of the components (A) and (B),
   the glass transition temperature ($T_G$) of the at least one polyamide composition (PC) is from 30 to 80° C.;
   wherein the multilayer polymer film (P) has a thickness of from 10 to 100 μm;
   wherein the multilayer polymer film (P) is produced by a multi-blow molding process; and
   wherein at least 85 mol % of the dicarboxylic acid (A1) is isophthalic acid.

2. The multilayer polymer film (P) according to claim 1, wherein the component (B) is selected from the group consisting of polyamide 6 and polyamide 6/6.6.

3. The multilayer polymer film (P) according to claim 1, wherein the component (A1) comprises 85 to 95 mol % of isophthalic acid.

4. The multilayer polymer film (P) according to claim 1, wherein:
   the at least one amorphous polyamide (A) is produced by polymerization of components (A1) and (A2) and additionally a component (A3); and
   component (A3) is selected from the group composed of lactams with 4 to 12 carbon atoms and monomer mixtures (M) comprising at least one linear aliphatic dicarboxylic acid with 4 to 12 carbon atoms and at least one linear aliphatic diamine with 4 to 12 carbon atoms.

5. The multilayer polymer film (P) according to claim 1, wherein the component (A) has a glass transition temperature ($T_{G(A)}$) ranging from 130 to 150° C.

6. The multilayer polymer film (P) according to claim 1, wherein the component (B) has a melting temperature ($T_{M(B)}$) ranging from 170 to 230° C.

7. The multilayer polymer film (P) according to claim 1, wherein the component (A) has an intrinsic viscosity ($IV_{(A)}$) ranging from 60 to 200 ml/g, determined in a 0.5 wt % solution of the component (A) in 96 wt % of sulfuric acid at 25° C.

8. The multilayer polymer film (P) according to claim 1, wherein the component (B) has an intrinsic viscosity (IV(B)) ranging from 90 to 350 ml/g, determined in a 0.5 wt % solution of component (B) in 96 wt % of sulfuric acid at 25° C.

9. The multilayer polymer film (P) according to claim 1, wherein the component (A) comprises poly(2-methyl-1,5-pentamethylene isophthalamide-co-2-methyl-1,5-pentamethylene terephthalamide).

10. A method for packaging food products, the method comprising:
    a) enclosing a food product with the multilayer polymer film (P) according to claim 1, wherein the multilayer polymer film (P) has a first temperature (T1); and
    b) heating the multilayer polymer film (P) to a second temperature (T2) ranging from 60 to 150° C., causing the multilayer polymer film (P) to shrink around the food product,
    wherein the first temperature (T1) is below the glass transition temperature of the at least one polyamide composition (PC) contained in the multilayer polymer film (P).

11. The multilayer polymer film (P) according to claim 1, wherein 100 mol % of the dicarboxylic acid (A1) is isophthalic acid.

12. The multilayer polymer film (P) according to claim 1, wherein the glass transition temperature ($T_G$) of the at least one polyamide composition (PC) is from 40 to 70° C.

13. The multilayer polymer film (P) according to claim 1, wherein the polyamide composition (PC) of the polyamide composition layer comprises 25 to 30 wt % of the at least one amorphous polyamide produced by polymerization of the (A1) and (A2) components.

14. The multilayer polymer film (P) according to claim 1, wherein the polyamide composition (PC) layer has a thickness of from 0.5 μm to 50 μm, and
    wherein at a thickness of 100 μm the polymer film (P) has a puncture resistance of 7.1 to 10.2 N/mm according to DIN EN 14477:2004, and a tear stress of 494 to 547% according to ISO 527-3: 2003.

* * * * *